March 14, 1933. L. G. TATRO 1,901,272
COORDINATED BATTERY CONSTRUCTION
Filed April 16, 1930
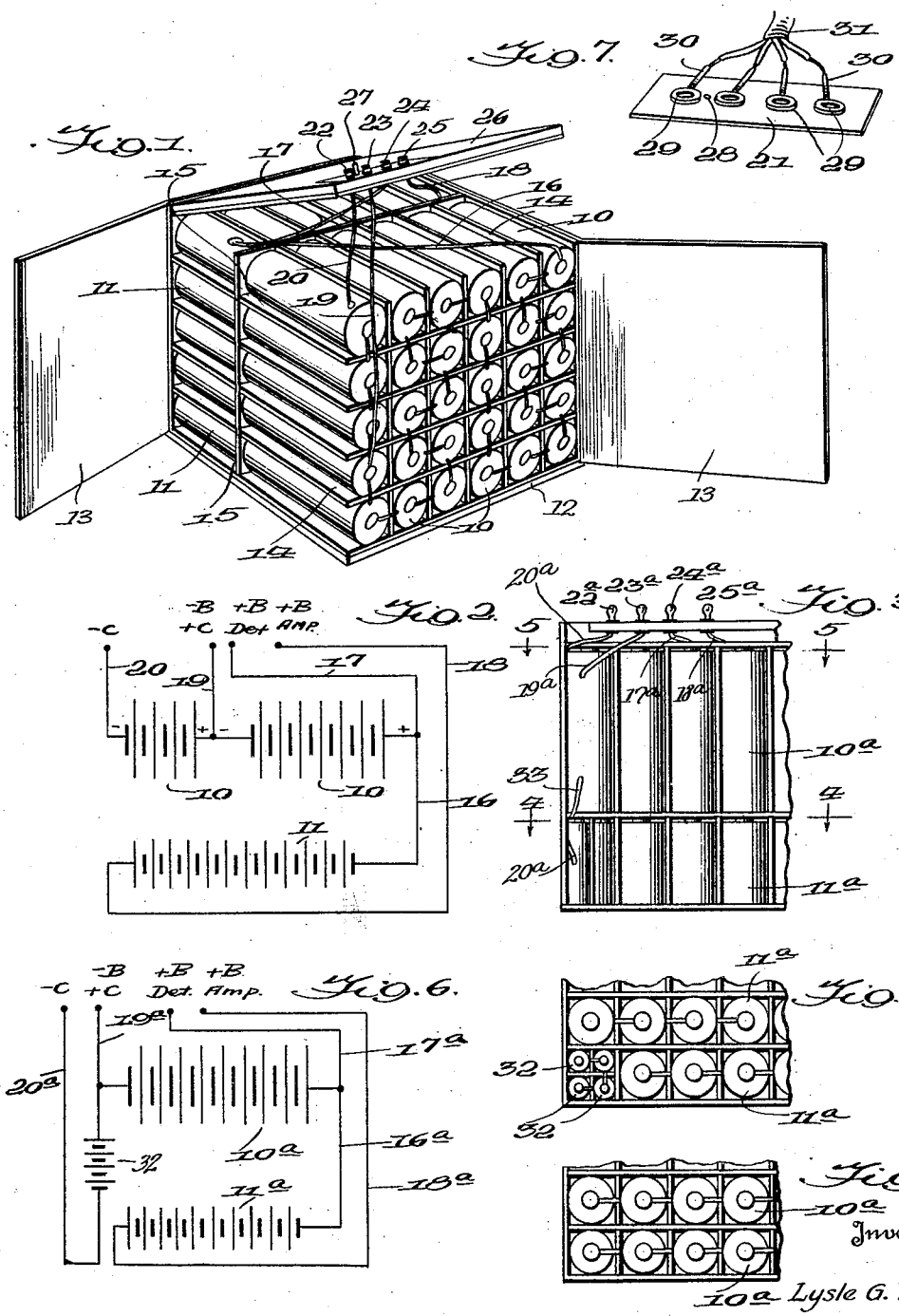
Inventor
Lysle G. Tatro
By Emery, Booth, Varney & Holcombe
his Attorneys Patented Mar. 14, 1933

1,901,272

UNITED STATES PATENT OFFICE

LYSLE G. TATRO, OF DECORAH, IOWA, ASSIGNOR TO H. B. MONTGOMERY, OF DECORAH, IOWA

COORDINATED BATTERY CONSTRUCTION

Application filed April 16, 1930. Serial No. 444,822.

This invention relates to a coordination of batteries for supplying a plurality of circuits at different potentials, such as the "B" or "B" and "C" batteries and circuits of radio receivers, and aims to so coordinate the cells utilized in the several circuits that all cells will have approximately the same effective life under the drain to which they are subjected so that the entire set of batteries will become substantially exhausted at substantially the same time.

A further aim of my invention is to coordinate the cells in this manner so that the cells for a plurality of circuits, (which may be overlapping circuits as a plurality of "B" circuits) may be encased as a single unit to be simultaneously replaced, without liklihood that cells having substantial residual life will have to be discarded because the exhaustion of other cells in the unit renders it unfit for further service.

A further aim of my invention is to improve the efficiency and construction of such battery units.

Further objects and advantages of my invention will be apparent from the following description of preferred forms of batteries embodying my invention, and it is not intended to exclude such other objects and advantages of my invention by the enumeration of those that I now consider to be the most important.

Referring to the drawing constituting a part of this specification:

Fig. 1 is a perspective view of a preferred form of my "B" and "C" power unit, with the casing torn away to show the internal arrangement;

Fig. 2 is a diagrammatic representation of the arrangement of Fig. 1;

Fig. 3 is a vertical sectional view through a modified form of "B" and "C" unit according to my invention;

Fig. 4 is a sectional plan view taken on line 4—4 of Fig. 3, showing in plan the "short layer" thereof;

Fig. 5 is a plan view of the "deep layer" of the same, taken at line 5—5 of Fig. 3;

Fig. 6 is a diagram of the arrangement of cells according to Figs. 3, 4 and 5; and Fig. 7 is a perspective view of one form of a battery connecting cable strip according to my invention which cooperates with the battery proper.

Ordinary multiple-voltage "B" batteries for supplying a high "B" potential to the amplifier tubes and less "B" potential to the detector tube of radio receivers, as heretofore constructed have been provided with a tapped in lead intermediate the ends of the battery to supply the lower "B" potential for the detector tube. The tapped "B" batteries have been objectionable because of the fact that the cells of the battery have all had the same current generating capacity with the result that substantial exhaustion of the cells supplying plate current for the detector as well as the amplifier tubes has rendered useless and made it necessary to discard the "B" battery block as a whole, long before the cells drawn upon by the amplifier tubes only have served their full life.

My invention largely eliminates this objection by proportioning the current generating capacity of the cells of each portion of the battery to the current drain to which they will be normally subjected in use; and so far as I am aware, no one has heretofore proposed a "B" or "B" and "C" power-battery unit proportioned in this way to effect compactness and insure complete efficiency and use of all the current generating capacity of the unit, so that there need be no loss or waste of unexpended energy by replacing in entirety the "B" and "C" power supplies of the set when no longer suitable for satisfactory operation, thereby avoiding the fragmentary replacement of these power supplies which is always a source of troublesome noise and inefficient operation, and has been one of the most prevalent reasons why battery supplied receivers have failed to satisfy their users.

My invention, as shown in Figs. 1 and 3 and indicated in Figs. 2 and 6, comprises relatively large cells 10 in that section of the battery block which supplies both detector and amplifier tubes, and relatively small cells 11 in that section of the battery block drawn upon only to supply plate current for the amplifier tubes. These cells 10 and 11 are preferably proportioned to have relative current generating capacities approximating the relative current drains to which they will be subjected in normal use.

By this construction I am able to provide a battery having the same life as though all the cells therein were the same size as the largest cell therein, while at the same time I reduce the size and weight of the battery materially, reduce the amount of material used in making it, and cheapen its cost.

Referring to Figs. 1 and 2, illustrative of one construction embodying my invention, the power unit therein disclosed comprises a casing made up of a bottom 12 and side walls 13, forming a box to receive the cells 10 and 11 and the insulating strips 14 separating said cells from one another.

In the construction of this form of battery I prefer to assemble the cells in two individual blocks as shown, one block being made up of the "short" cells 11 having a relatively small current generating capacity, and the other block being made up of the "deep" cells 10, of greater current generating capacity, the difference in current generating capacity of the two groups of cells being approximately sufficient to take care of the added detector tube, so that all the cells will become substantially exhausted at the same time.

Thus, assuming that the battery is designed for use with a set having 6 milliamperes drain throughout the block due to the drain of the amplifier tubes, and 3 milliamperes additional drain across the larger cells due to the drain of the detector tube, the larger cells would be of such size as to have the same service life at 9 milliamperes drain as the smaller cells would have at 6 milliamperes drain, so that all the cells would become exhausted at about the same time.

In making up the battery shown in Figs. 1 and 2 the "deep" cells 10 are assembled with separator sheets 14, which may be assembled in "egg-crate" style, and these cells are then connected in series, and the smaller cells are similarly assembled. I prefer for simplicity of construction to employ cells of the same diameter and varying depth, as shown, but my invention is not limited in this respect, as cells of varying diameter and/or length may be used, although the assemblage will not be as simple.

The two groups of cells having been assembled with their insulating sheets are next placed in juxtaposed position, as shown, with the insulating sheet 15 interposed between them.

The wire 16 is soldered in place connecting the positive end of the group of large cells to the negative end of the group of small cells and a tapping wire 17 is connected at this point constituting the "+B detector" lead while a wire 18 soldered to the positive end of the group of small cells constitutes the "+B amplifier" lead.

If thirty cells are used in each group as shown, each group will have a voltage of 45 volts, and according to my arrangement a maximum of 90 volts for the amplifier plates and a maximum of 45 volts for the detector plate, would be available.

However, I consider it advantageous to embody my "C" battery in the same unit, if these voltages are greater than the voltages necessary for the successful operation of the receiver with which the battery is to be used, so that instead of taking my negative "B" lead from the negative end of the large group of cells, I may choose an intermediate point in the first group of cells and lower my "B" voltages accordingly, reserving the cells thus unused for "B" voltage, to constitute my "C" battery, the positive side of which is almost always connected to the negative side of the "B" battery.

I accordingly tap into my group of larger cells with the wire 19 constituting the "−B" and "+C" lead, and solder a fourth lead 20 to the negative side of the entire group of large cells to constitute a "−C" lead.

The "−C", "+C and −B", "+B detector" and "+B amplifier" leads 20, 19, 17 and 18, respectively, are brought out through binding posts or other terminals 22, 23, 24 and 25, respectively, located in the top of the box, which may be suitably sealed in with insulating wax 26; and in order to prevent improper connection of my battery cable connector shown in Fig. 7, I also provide means insuring the proper positioning of the same, which may take the form of a pin 27 adapted to be engaged by a hole 28 in the connector strip 21, which in the form shown is provided with tubular rivets 29 supplied with soldering lugs 30 to which are soldered in the proper order the "B" and "C" battery leads of the battery cable 31.

The form of my improved "B" and "C" battery unit above described applies my invention only to the "B" battery cells, because for simplicity of construction, and because of the small number of cells used for the "C" supply, it might not be considered a great waste to sacrifice the "C" cells if they were not completely exhausted when those of the "B" battery became so.

However, I contemplate that the "C" cells may be proportioned to have an effective life at the normal "C" current drain more nearly equal to the effective life of the "B" cells, and in Fig. 3, I have shown an assemblage wherein the "C" cells are of decreased size more nearly proportionate to the "C" drain, and arranged so that a full layer of large cells may be had to provide "B detector" voltage, while an almost full layer is available for the added "B amplifier" voltage.

In Figs. 3 to 6, inclusive, the large cells 10ª are connected in series and the "−B and +C" lead 19ª is connected to the negative side of the group of large cells, while the "+B detector" lead 17ª is connected to the positive side of the group of large cells. The lead 16ª connects the positive side of the group of large cells 10ª to the negative side of the group of smaller cells 11ª and the "+B amplifier" lead 18ª connects to the positive side of the group of cells 11ª. Instead of using several of the large cells for the "C" battery, in this arrangement all the larger cells 10ª are connected in the "B" battery and in place of one of the smaller cells 11ª, a "C" battery unit of still smaller cells 32 is inserted as shown, these cells 32 being connected in series and provided with a short positive and long negative lead as shown. The short positive lead is soldered to the shell of the cell 10ª at the negative side of the "B" battery, as shown at 33, Fig. 3, and the long negative lead constitutes the "−C" connection of the unit.

In this form of the device I have shown the "−C", "−B and +C", "+B detector", and "+B amplifier" leads 22ª, 23ª, 24ª and 25ª, respectively, as of the "snap fastener post" type, and have indicated how they may be irregularly spaced to insure that the connector strip, which would resemble that shown in Fig. 7 except that single or double sided snap fastener sockets would be substituted for the tubular rivets 29, can be permanently attached in but one way, the right way.

It will be noted that the means 27–28 (Figs. 1 and 7) for insuring proper connection of the connector strip to the battery, if symmetrically positioned with respect to the center-line of the connections, will enable the strip to be attached either with the soldering lugs 30 directed over the edge of the battery or away from the edge of the battery; the former connection being useful when the battery cable is short, and the latter connection offering better protection to the soldering lugs if the battery cable is long enough to enable connection across the width of the battery or to enable it to be bent back on itself.

It will be further noted that in Fig. 1 I have shown the cells assembled on their sides, while in Fig. 3 I have shown them standing upright. The latter arrangement is the one that I prefer and think the best from the standpoint of preventing drying out of the cells should side-wall leaks occur therein, but the former is frequently advantageous to produce a better shaped unit, and cells of the "non-drying" type as now known on the market will obviate any danger of drying out of a leaky cell.

Proving a "B" or a "B" and "C" unit according to my invention insures that before failure of the unit substantially all the effective life of substantially all the cells will have been made use of, in contradistinction to the ordinary tapped "B" unit in which the cells drawn upon by the detector and amplifier tubes become exhausted long before the entire life of the cells drawn upon by the amplifier tubes alone has been served. Moreover, my unit construction insures replacement of all the "B" and "C" battery supplies at the same time, which is essential for the best results with the receiver.

Having described what I consider to be the best embodiments of my invention I wish it to be distinctly understood, however, that the specific descriptions above are not intended to be limiting, but are intended to be merely illustrative and that I claim as my invention all equivalents of the combinations and features of my invention set forth in my claims.

I claim:

1. A "B" and "C" battery unit comprising a unitary casing, a "B" battery enclosed therein, a "C" battery also enclosed therein, said "C" battery having an effective life at the contemplated "C" current drain, at least equal to the effective life of the "B" battery under the contemplated "B" current drain, said "B" battery being comprised of a plurality of blocks of cells one of which includes cells of said "C" battery; the "B" battery cells of one of said respective blocks being of substantially the same diameter as, but relatively deeper than, those of a second block and being assembled in diametrically superposed relation thereto in said casing, substantially as and for the purposes described.

2. A battery unit comprising a casing, a group of relatively deep series connected cells, a second group of series connected cells of the same diameter as those of the first group but relatively short in comparison thereto, said two groups of cells being assembled in diametrically superposed relation in said casing, and terminals carried by said casing connected to the ends of said two groups of cells, substantially as and for the purposes described.

3. A "B" and "C" battery unit comprising a casing containing a block of relatively deep series connected cells, a group of series connected cells of the same diameter as the cells of said first block, but of less depth and of fewer cells, and an assembly of cells of substantially the same depth as the cells of the said group, but of less diameter, said assembly of cells being positioned adjacent said group of cells and forming therewith a block substantially equal in area to said first block of cells, a connection from the positive side of said assembly of smallest cells to the negative side of said block of largest cells and a lead therefrom, a connection from the positive side of said block of largest cells to the negative side of said group of cells and a lead therefrom, and leads connected to the negative side of said assembly of smallest cells and the positive side of said block of largest cells, substantially as and for the purposes described.

In testimony whereof, I have signed my name to this specification.

LYSLE G. TATRO.